United States Patent [19]
Mazerolle et al.

[11] Patent Number: 6,097,527
[45] Date of Patent: Aug. 1, 2000

[54] SYSTEM FOR THE REDUCTION OF LASER EQUIVALENT SURFACE AND FOR OPTICAL PROTECTION

[75] Inventors: Denis Mazerolle, Paris; Claude Puech, Ballainvilliers; Jean-Luc Espie, Mornant, all of France

[73] Assignee: Thomson-CSF, Paris, France

[21] Appl. No.: 09/203,580

[22] Filed: Dec. 2, 1998

[30] Foreign Application Priority Data

Dec. 2, 1997 [FR] France .................................. 97 15140

[51] Int. Cl.⁷ ....................................................... G02F 1/03
[52] U.S. Cl. ............................................ 359/246; 359/245
[58] Field of Search ..................................... 359/245, 246, 359/247, 251, 252, 253, 254, 484, 494, 498, 500, 501

[56] References Cited

U.S. PATENT DOCUMENTS

| | | | |
|---|---|---|---|
| 3,658,405 | 4/1972 | Pluta ........................................... | 350/12 |
| 3,785,714 | 1/1974 | Hock et al. ................................. | 350/15 |
| 5,229,833 | 7/1993 | Stewart ...................................... | 356/364 |
| 5,343,313 | 8/1994 | Fergason ..................................... | 359/83 |
| 5,377,032 | 12/1994 | Fergason et al. ........................... | 359/62 |
| 5,473,465 | 12/1995 | Ye ............................................... | 359/246 |
| 5,519,522 | 5/1996 | Fergason ..................................... | 359/66 |
| 5,541,744 | 7/1996 | Charlot et al. .............................. | 359/11 |
| 5,856,873 | 1/1999 | Naya et al. ................................. | 356/369 |
| 5,926,295 | 7/1999 | Charlot et al. .............................. | 359/30 |

FOREIGN PATENT DOCUMENTS 0 604 031 6/1994 European Pat. Off. .

OTHER PUBLICATIONS

Hisao Kikuta, et al., "Achromatic Quarter–Wave Plates Using the Dispersion of Form Birefringence", Applied Optics, XP 000684848, vol. 36, No. 7, Mar. 1, 1997, pp. 1566–1572.

"Optics Guide 4", Melles Griot Company, Melles Griot, Irvine, US, XP–002073141 Retardation Plates, 198, pp. 15–24–15–26.

Michael Bass, "Handbook of Optics, vol. II", McGraw–Hill, New York, USA, 1995, XP–002073223, pp. 3.52–3.65.

Primary Examiner—Hung Xuan Dang
Attorney, Agent, or Firm—Oblon, Spivak, McClelland, Maier & Neustadt, P.C.

[57] ABSTRACT

A system for the reduction of a laser equivalent surface area and for the optical protection of an optical device including a first polarizer and a first multiple wavelength quarter-wave plate placed in series in the path of a multiple wavelength light beam between the polarizer and the optical device. This system brings into play polarized light, and associates a liquid crystal shutter with it, providing for protection against optical aggression. The entire unit may take the form of a detachable optical attachment.

8 Claims, 2 Drawing Sheets ion of laser equivalent surface area and for optical protection especially against aggression by laser beams.

In an aimed optical system, the detector (the retina of the eye or an electronic image sensor, for example of the CCD type), located in the vicinity of a focal plane of the system is liable to reflect incident light in the direction of incidence. This phenomenon, which is commonly called the "cat's eye effect" is especially troublesome when the optical system has to be discreet. Indeed, the system can be easily detected and located at a distance by means of a simple divergent source associated with an imaging system. Once localized, the system may be attacked by means of a high power source which may result in the destruction of the user's retina or of the sensor.

The parameter used by those skilled in the art, which expresses the capacity of an optical system to reflect light along the direction of incidence, is called the laser equivalent surface area. The laser equivalent surface area of the naked eye is about 0.1 $m^2$ while that of the eye associated with a standard pair of binoculars is some hundreds of $m^2$. That of a CCD camera commonly attains several thousand of $m^2$. These values may vary considerably depending on the optical quality of the system.

If it is desired to aim at an object while remaining discreet, which is especially the case in military applications, it is particularly important to be able to reduce the laser equivalent surface area of the system while lowering the quality and luminosity of the image given by the system to the least possible extent.

Furthermore, if the system has reduced laser equivalent surface area, the risk of localization will be lower. However it can never be strictly zero. It is therefore desirable that the system should also enable protection against laser aggression.

Two methods are used to reduce the laser equivalent surface area of an optical system.

The first method consists of the use of optical filters centered on the usual wavelengths of the lasers. The laser equivalent surface area of the system is therefore reduced for these wavelengths only. There is therefore a risk that this system may be detected by a source with an unusual wavelength or by an agile source.

The second method is applicable only to systems that comprise an electronic image sensor. It consists of the deposition, on the sensor, of a layer limiting the reflection of light on the surface of the sensor. This method has limited efficiency and cannot be applied to direct viewing systems (binoculars, etc.).

SUMMARY OF THE INVENTION

The invention relates to a system enabling the reduction, by a major factor, of the laser equivalent surface area of any optical system, for example a direct viewing system, or including an image sensor or again including a light intensification system.

The invention therefore relates to a system for the reduction of laser equivalent surface area and for the optical protection of an optical device, wherein said device comprises a first polarizer and a first multiple wavelength quarter-wave plate placed in series in the path of a multiple wavelength light beam between the polarizer and the optical device.

BRIEF DESCRIPTION OF THE DRAWINGS

The various objects and characteristics of the invention shall appear more clearly from the following description and from the appended figures, of which.

MORE DETAILED DESCRIPTION

Figures 1A, 1B:
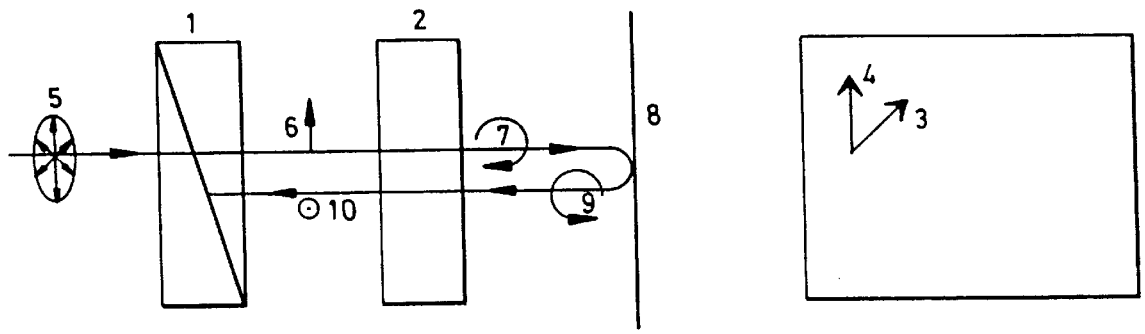
FIGS. 1a and 1b show the basic system of the invention.

The basic system of the invention is shown in FIGS. 1a, 1b. It comprises a linear polarizer 1 and a quarter-wave plate 2 whose fast or slow axis 3 forms an angle of 45° with the axis 4 of the polarizer. When an optical wave 5 with any polarization crosses the polarizer 1, it emerges in the form of a linearly polarized wave 6. It then crosses the quarter-wave plate 2 and emerges as a circularly polarized wave 7. If this wave is then reflected on a weakly scattering plane 8, the reflected wave 9 will also have a circular polarization but its direction will be inverted with respect to the polarization of the incident wave 7. Consequently, when the reflected wave again crosses the quarter-wave plate 2, it will emerge in a linearly polarized state along a direction perpendicular to the axis of the polarizer I and will be absorbed or rejected by this polarizer.

The system must work in a wide range of wavelengths. This is why, according to the invention, there is provided a quarter-wave plate with a special design. For example, this quarter-wave plate will be made, as proposed in the article by H. KIKUTA et al., Applied Optics, Vol. 36, No. 7, March 1997, pp. 1566–572, by means of a sub-wavelength index grating.

The system thus constituted (polarizer and quarter-wave plate) is integrated in the optical path of an optical system in order to attenuate the light reflected on the detector (the retina of the eye or the electronic image sensor) which plays the role of the reflected plane 8. These components may be positioned either upline with respect to an imaging objective or between the objective and the detector or between the lenses of the objective. In any case, the polarizer must be placed upline with respect to the quarter-wave plate. A promising approach consists in placing these two components upline with respect to the objective in the form of a lens attachment or optical attachment that is added when it is desired to reduce the laser equivalent surface area of the system.

According to one variant of the invention, the polarizer 1 and the quarter-wave plate are formed by means of a circular polarizer comprising a chiral material such as a nematic or cholesteric liquid crystal whose helix arrangement makes it possible to transmit only the right circular or left circular components.

The polarizer may be formed by a dichroic type polarizing plate (Polaroid for example) which absorbs the perpendicular component of light or a polarization separator (such as a separator cube, a Thompson prism, etc.).

Figure 2:
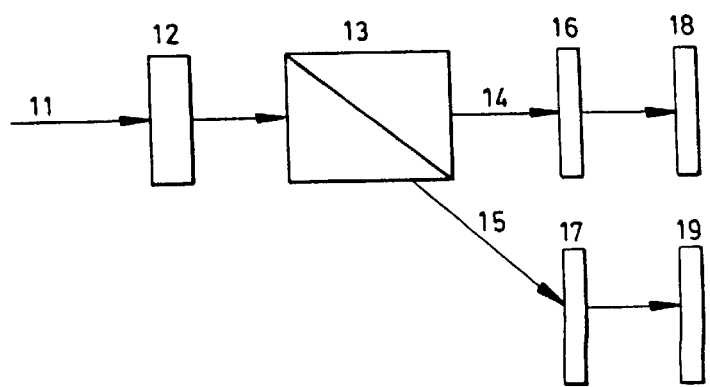
FIG. 2 shows the application of the invention to a system with two output channels.

FIG. 2 shows the case of a polarization separator providing two output channels. The light 11 first of all enters the objective 12 and is then divided into two beams 14, 15 by means of a linear polarization separator 13. Each of the beams crosses a quarter-wave plate 16, 17 oriented by 45° with respect to the direction of polarization of the beam before reaching the detector 18, 19. If the separator is of the circular polarization separator type (for example a cholesteric liquid crystal plate), the reduction of the laser equivalent surface area is obtained intrinsically without any addition of the component.

Figure 3:
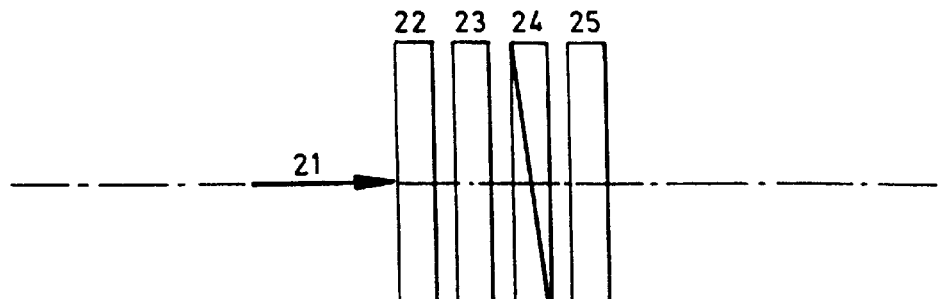
FIG. 3 shows the application of the system of the invention to an optical attachment for the reduction of the laser equivalent surface.

The scene observed may comprise zones emitting highly polarized light, for example the surface of water illuminated at an incidence close to the Brewster index. This is why, as shown in FIG. 3, in order to prevent these zones from having their luminosity amplified or attenuated by the polarizer, the light is depolarized by placing another quarter-wave plate 23 upline with respect to the polarizer 24 and the quarter-wave plate 25, the fast or slow axis of this quarter-wave plate 23 forming an angle of 45° with the axis of the polarizer 24. Thus, if the incident light is linearly polarized, for example perpendicularly to the input polarizer, it will emerge with a circular polarization of the quarter-wave plate 23 and only half of its intensity will be absorbed by the polarizer (instead of almost all its intensity if the light should be directly incident to the polarizer).

The various components of the isolator system have to be capable not only of having sufficient angular admittance but also of working in a spectral domain which may be relatively wide, for example the entire visible spectrum. With regard to the polarizer, the Polaroid type technology makes it possible for example to obtain operation throughout the visible spectrum with an angle of admittance of the order of ±20°. With regard to the quarter-wave plate, the technology for the stacking of birefringent polymer sheets enables similar performance characteristics.

In order to prevent the laser equivalent surface area from remaining great in a spectral band other than the useful band, we also propose the insertion in the system of a filter 22 that lets through only the useful band.

According to the invention, the system of FIG. 3 is made in the form of a lens attachment or optical attachment comprising the filter, the quarter-wave plate 23, the polarizer 24 and the quarter-wave plate 25. An optical attachment of this kind can be mounted on an optical system such as an objective.

The incident light beam 21 successively goes through the four components of the optical attachment. The bandpass filter may be placed also downline with respect to the other components or else interposed between two components.

It is possible to envisage an optical observation or aiming system equipped with an optical attachment of this kind that is detachable. In a normal situation, the optical attachment is not used. This makes it possible to avoid attenuating the light fluxes that reach the detector. In the event of necessity, if is desired to continue the observation or the aiming as discreetly as possible, the optical attachment is interposed in the optical path, for example upline with respect to the objective. Thus, the laser equivalent surface area of the system is considerably diminished, in attenuating the light flux that reaches the detector by a factor of only 2.

Figure 4:
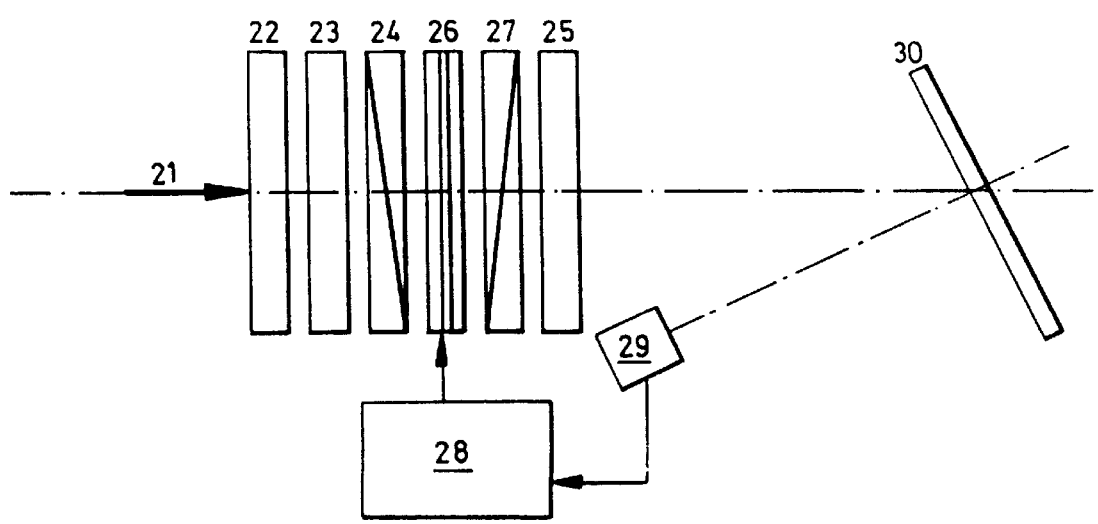
FIG. 4 shows a system for the reduction of laser equivalent surface area and for active protection against laser aggression.

FIG. 4 shows a system capable of working actively. Downline from the polarizer 24, it has an active system of protection against laser aggression. This active system may be an electrooptical shutter 26, for example a photo-activated liquid crystal cell (or a cell that is activated electrically as soon as the detected light intensity goes beyond a certain threshold) placed between two polarizers 24 and 27, one of the polarizers possibly being the polarizer 24 of the projection system. Thus, for normal illumination, almost all the light is recovered and, for high illumination, the liquid crystal switches over and causes the polarization to rotate in such a way that the light is absorbed by the second polarizer 27. The liquid crystal cell may be for example of a nematic or ferroelectric type and may comprise a layer of photosensitive material (for example amorphous silicon) so as to be directly photo-activated.

The polarizer 27 is oriented perpendicularly to the polarizer 24. The assembly formed by the polarizer 24, the liquid crystal cell 25 and the polarizer 27 constitutes a cell whose thickness is adjusted so that it behaves like a quarter-wave plate. When off voltage, the liquid crystal molecules are oriented at 45° with respect to the axes of the polarizers. The light is therefore not absorbed by the polarizer 24. In the presence of a voltage, the molecules are oriented along the axis of one of the polarizers. The light is therefore absorbed by the polarizer 24. This provides the protection against aggression.

This system is controlled by an electronic system 28 placed at output of a detector 29 recovering a part of the incident light by means of a weakly reflective plate 30. As soon as the detected light intensity goes beyond a certain threshold, a voltage is sent to the liquid crystal cell 26 in order to switch it into the off state.

Another exemplary implementation of the invention consists of the application of the system of FIG. 2 to the system described in the French patent application No. 93 04518 filed by the present Applicant under the title "Systeme optique d'observation binoculaire" (Binocular Optical Observation System). Should the "separator" mentioned in this patent application be of the linear polarization type, it is possible, as indicated in FIG. 2, to insert a quarter-wave plate on each output beam corresponding to each of the ocular paths to reduce the laser equivalent surface area of the system. If the separator is of the circular polarization separator type (for example a cholesteric liquid crystal plate), the reduction of the laser equivalent surface area is obtained intrinsically without the addition of a component.

Just as in the previous example, it is possible to place a liquid crystal shutter on each of the two polarized beams, this shutter enabling the user to be protected against laser aggression.

What is claimed is:

1. A system for a reduction of a laser equivalent surface and an optical protection of an optical device, comprising:

a first polarizer;

a first multiple wavelength quarter-wave plate placed in series in a path of an incident light beam between the polarizer and the optical devices; and a second multiple wavelength quarter-wave plate placed on a side opposite the first quarter-wave plate with respect to the polarizer, wherein a fast and a slow axis of the second quarter-wave plate form an angle of 45° with an axis of the polarizer.

2. A system according to claim 1, wherein the polarizer comprises a polarization separator supplying, along two different directions, two beams with orthogonal polarization and wherein the system comprises a quarter-wave plate in each direction.

3. A system according to claim 1, further comprising a diffraction grating.

4. A system according to claim 1, further comprising a bandpass filter.

5. A system according to claim 1, wherein the first polarizer, the first quarter-wave plate and the second quarter-wave plate are stacked and grouped together to form an optical attachment mountable the optical device.

6. A system according to claim 1, further comprising:
a second polarizer oriented perpendicularly to the first polarizer; and
a liquid crystal cell sandwiched between the first polarizer and the second polarizer,
wherein the liquid crystal cell is electrically controllable so that, on command, liquid crystal molecules in the liquid crystal cell are oriented in parallel to axes of the first and second polarizers or at 45° to said axes.

7. A system according to claim 6, further comprising a semi-reflecting plate placed in the path of the beam and configured to deflect a part of the light beam towards a system of photodetection that controls the liquid crystal cell as a function of the light intensity that the system of photodetection detects.

8. A system according to claim 1, wherein the polarizer and the quarter-wave plate comprise a circular polarizer formed by a chiral material having a helix arrangement.

* * * * *